(12) United States Patent
Alayli et al.

(10) Patent No.: US 9,853,946 B2
(45) Date of Patent: Dec. 26, 2017

(54) SECURITY COMPLIANCE FOR CLOUD-BASED MACHINE DATA ACQUISITION AND SEARCH SYSTEM

(71) Applicant: Splunk Inc., San Francisco, CA (US)

(72) Inventors: Hassan Alayli, San Francisco, CA (US); Jagannath Kerai, Cupertino, CA (US)

(73) Assignee: Splunk Inc., San Francisco, CA (US)

( * ) Notice: Subject to any disclaimer, the term of this patent is extended or adjusted under 35 U.S.C. 154(b) by 76 days.

(21) Appl. No.: 14/806,510

(22) Filed: Jul. 22, 2015

(65) Prior Publication Data

US 2017/0026340 A1    Jan. 26, 2017

(51) Int. Cl.
| | |
|---|---|
| *G06F 9/00* | (2006.01) |
| *G06F 15/16* | (2006.01) |
| *G06F 17/00* | (2006.01) |
| *H04L 29/06* | (2006.01) |
| *G06F 17/30* | (2006.01) |

(52) U.S. Cl.
CPC ...... *H04L 63/029* (2013.01); *G06F 17/30312* (2013.01); *G06F 17/30424* (2013.01); *G06F 17/30557* (2013.01); *H04L 63/08* (2013.01)

(58) Field of Classification Search
CPC ............ H04L 63/1416; H04L 63/1425; H04L 63/1441; G06F 21/554; G06F 2221/033
USPC ........................................................ 726/23
See application file for complete search history.

(56) References Cited

U.S. PATENT DOCUMENTS

| | | | |
|---|---|---|---|
| 8,874,755 B1 | 10/2014 | Deklich et al. | |
| 8,978,036 B2 | 3/2015 | Fletcher et al. | |
| 9,047,246 B1 | 6/2015 | Rahut | |
| 9,256,501 B1 | 2/2016 | Rahut | |
| 2007/0198656 A1* | 8/2007 | Mazzaferri | G06F 3/1415 709/218 |
| 2011/0214157 A1* | 9/2011 | Korsunsky | G06F 21/55 726/1 |
| 2011/0238855 A1* | 9/2011 | Korsunsky | G06F 21/55 709/231 |
| 2012/0240185 A1* | 9/2012 | Kapoor | H04L 63/1425 726/1 |
| 2014/0362763 A1* | 12/2014 | Hu | H04W 16/26 370/315 |

* cited by examiner

*Primary Examiner* — Kambiz Zand
*Assistant Examiner* — Stephen Sanders
(74) *Attorney, Agent, or Firm* — Perkins Coie LLP (57) ABSTRACT

Disclosed herein are a method, apparatus and system that authenticate a first data forwarder, of a distributed machine data acquisition and search system (MDASS), to a node that regulates traversal of a firewall that protects a protected environment within which the data forwarder operates. The authentication may be performed by using a SOCKS5 authentication process. The method further includes, only after successful completion of the SOCKS5 authentication process, establishing a first connection, through a network, between the first data forwarder and a first indexer of the distributed MDASS, where the first indexer operates outside the protected environment, and sending machine data acquired by the first data forwarder from a machine data source, to the first indexer via the first connection.

30 Claims, 9 Drawing Sheets

SECURITY COMPLIANCE FOR CLOUD-BASED MACHINE DATA ACQUISITION AND SEARCH SYSTEM

FIELD

At least one embodiment of the present disclosure pertains to information organization and understanding, and more particularly, to the organization and understanding of machine data.

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The techniques introduced here include, among other features, a distributed machine data acquisition and search system (MDASS) that is at least partially cloud-based, which can operate in the presence of on-premises security features that protect the data sources and/or other equipment. In particular, and as described in detail below, when a firewall protects the data sources and/or other on-premises entities, the techniques introduced here enable on-site data forwarders that gather machine data to be authenticated for purposes of traversing the firewall, thereby enabling the data forwarders to pass their acquired machine data through the firewall to remote elements of the MDASS. In certain embodiments, the techniques introduced here enable data forwarders to support SOCKS5 protocol to authenticate with an on-premises SOCKS5 firewall proxy, to allow the forwarders to forward event data to cloud-based indexers in a manner that adheres to a user's/customer's security policies. The term "SOCKS5" refers to Secure Sockets ("SOCKS") protocol version 5 as defined in RFC 1928 (March 1996).

In some environments, a user of an MDASS may install and configure, on computing devices owned and operated by the user, one or more software applications that implement some or all of these system components. This arrangement generally may be referred to as an "on-premises" solution, meaning that the MDASS is installed and operates entirely on computing devices directly controlled by the user of the system. However, other users may instead prefer an arrangement in which the user is not directly responsible for providing and managing the computing devices upon which various components of the MDASS operate, i.e., a "cloud-based" embodiment. Although the techniques introduced here are to at least some extent related to cloud-based embodiments of an MDASS, it is useful to consider first at least one embodiment of an on-premises MDASS.

On-Premises Embodiments

At least some of the challenges of analyzing and searching massive quantities of machine data can be addressed by using an event-based MDASS, such as the SPLUNK® ENTERPRISE system produced by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing unstructured data, which is commonly found in system log files, network data, and other data input sources. Although many of the techniques described herein are explained with reference to an MDASS similar to the SPLUNK® ENTERPRISE system, the techniques are also applicable to other types of data systems.

In the SPLUNK® ENTERPRISE system, machine-generated data is collected and stored as "events," where each event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, determined based on other configurable rules for assigning timestamps to events, etc.

Events can be derived from either "structured" or "unstructured" machine data. In general, structured data has a predefined format, where data items with specific data formats are stored at predefined locations in the data. For example, structured data may include data stored as fields in a database table. In contrast, unstructured data may not have a predefined format, that is, the data is not at fixed, predefined locations, but the data does have repeatable patterns and is not random. These patterns in the machine data can be identified and used to determine event boundaries. Unstructured data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include web servers, application servers, databases, firewalls, routers, operating systems, and software applications that execute on computer systems, mobile devices, sensors, etc. The data generated by such data sources can include, for example and without limitation, server log files, activity log files, configuration files, messages, network packet data, performance measurements, sensor measurements, etc.

The SPLUNK® ENTERPRISE system also facilitates use of a flexible schema to specify how to extract information from the event data, where the flexible schema may be developed and redefined as needed. Note that a flexible schema may be applied to event data "on the fly," when it is needed (e.g., at search time, etc.), rather than at ingestion time of the data as in traditional database systems. Because the schema is not applied to event data until it is needed (e.g., at search time, etc.), it can be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides the raw input data into blocks (e.g., buckets of data, each associated with a specific time frame, etc.), and parses the raw data to produce timestamped events. Event boundaries may be determined at least partially by identifying patterns in the machine data. The system stores the timestamped events in a data store, and enables users to run queries against the stored data to, for example, retrieve events that meet criteria specified in a query, such as containing certain keywords or having specific values in defined fields. In this context, the term "field" refers to a location in the event data containing a value for a specific data item.

As noted above, the SPLUNK® ENTERPRISE system facilitates application of a late-binding schema to event data while performing queries on events. One aspect of a late-binding schema is "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression ("regex") where a sequence of characters form a search pattern, in which case the rule is referred to as a "regex rule." The system applies the regex rule to the event data to identify where the associated field occurs in the event data by searching the event data for the sequence of characters defined in the regex rule.

In the SPLUNK® ENTERPRISE system, a field extractor can be configured to automatically generate extraction rules for certain fields in the events when the events are being created, indexed, or stored, or possibly at a later time. Alternatively, a user can manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or modifying the field extraction rules for use the next time the schema is used by the system. Because the SPLUNK® ENTERPRISE system maintains the underlying raw data and uses late-binding schemas for searching the raw data, it enables an analyst to investigate questions that arise as the analyst learns more about the events.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

Figure 1:
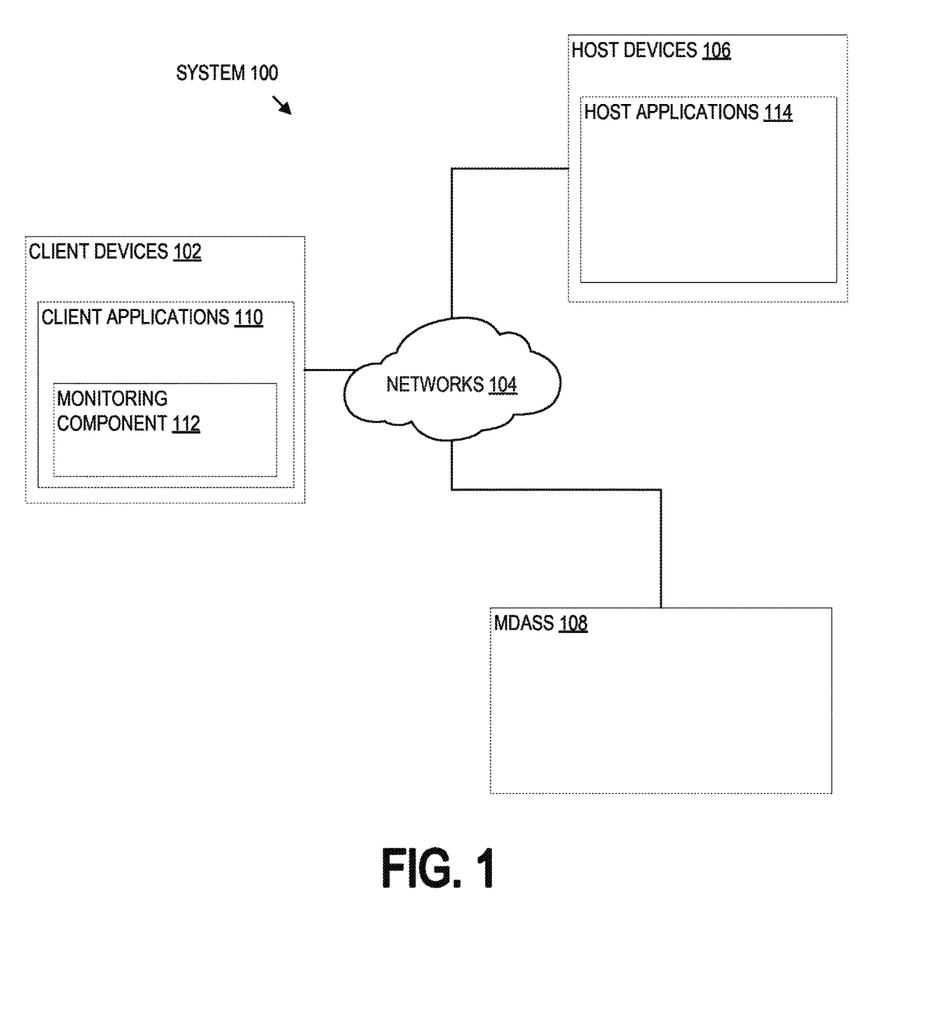
FIG. 1 illustrates a networked computer environment in which a machine data acquisition and search system (MDASS) can be implemented.

FIG. 1 illustrates a networked computer system 100 in which an embodiment may be implemented. FIG. 1 represents an example embodiment that is provided for purposes of illustrating a clear example; other embodiments may use different arrangements.

The networked computer system 100 includes one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and an MDASS 108 via one or more networks 104. Networks 104 broadly represent one or more local area networks (LANs), wide area networks (WANs), cellular networks (e.g., 3G, HSPA, LTE, LTE-A/4G, 5G, and other cellular technologies), and/or internetworks using any of wired, wireless, terrestrial microwave, or satellite links, and may include the public Internet ("the Internet").

In an embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. For example, each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include various request and response packets. For example, in general, a client device 102 may initiate communication with a host application 114 by making a request for a specific resource (e.g., based on an HTTP request), and the application server may respond with the requested content stored in one or more response packets.

In an embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising database server may generate one or more logs that record information related to requests sent from other host applications 114 (e.g., web servers or application servers) for data managed by the database server.

Client devices 102 of FIG. 1 broadly represent any computing device capable of interacting with one or more host devices 106 via a network 104. Examples of client devices 102 may include, without limitation, smart phones, tablet computers, other handheld computing devices, wearable devices, laptop computers, desktop computers, servers, portable media players, gaming devices, and so forth. In general, a client device 102 can provide access to different content, for instance, content provided by one or more host devices 106. Each client device 102 may comprise one or more client applications 110, described in more detail below.

In an embodiment, each client device 102 may host or execute one or more client applications 110 that are capable of interacting with one or more host devices 106 via one or more networks 104. For instance, a client application 110 may be or comprise a web browser which a user may navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Such performance data can be sent to the MDASS 108 to facilitate analysis of the performance data by, for example, a developer of the client application or other users. Monitoring component 112 may be an integrated component of a client application 110, a plug-in, an extension, or any other type of add-on to the application. Monitoring component 112 may also be a stand-alone process.

Figure 2:
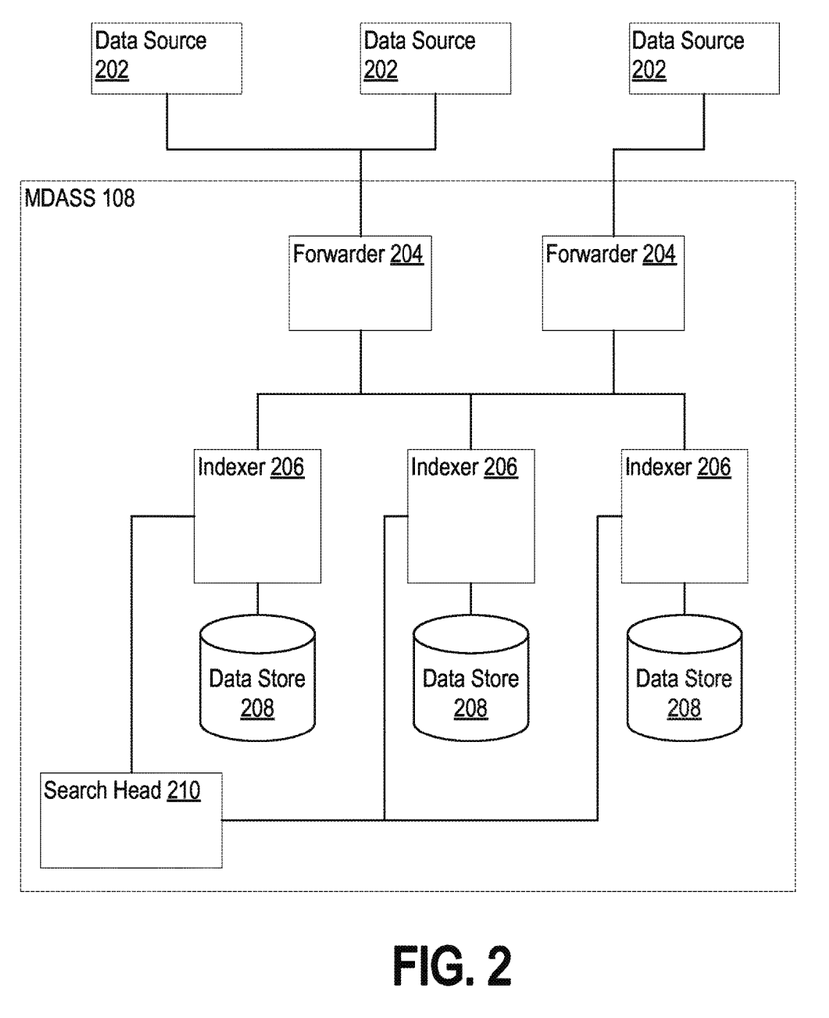
FIG. 2 shows an example of an MDASS.

FIG. 2 depicts a block diagram of an example of the MDASS 108, which can be similar to the SPLUNK® ENTERPRISE system. MDASS 108 includes one or more forwarders 204 that consume data from a variety of input data (machine data) sources 202, and one or more indexers 206 that process and store the data in one or more data stores 208. These forwarders and indexers can be or include separate computer systems, or alternatively can be or include separate processes executing on one or more computer systems.

Each data source 202 broadly represents a source of data can be consumed by the MDASS 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 can include a service accessible to client devices 102 and host devices 106 via a network 104. For example, one type of forwarder 204 may be capable of consuming vast amounts of real-time data from a potentially large number of client devices 102 and/or host devices 106. A forwarder 204 may include, for example, a computing device that implements multiple data pipelines or "queues" to handle forwarding of network data to indexers 206. In some embodiments a forwarder 204 may also perform some of the functions that are described herein as being performed by an indexer. For example, a forwarder 204 may perform keyword extractions on raw data or parse raw data into events and perform keyword extractions. A forwarder 204 may generate time stamps for events. Additionally or alternatively, a forwarder 204 may perform routing of events to indexers.

Figure 3:
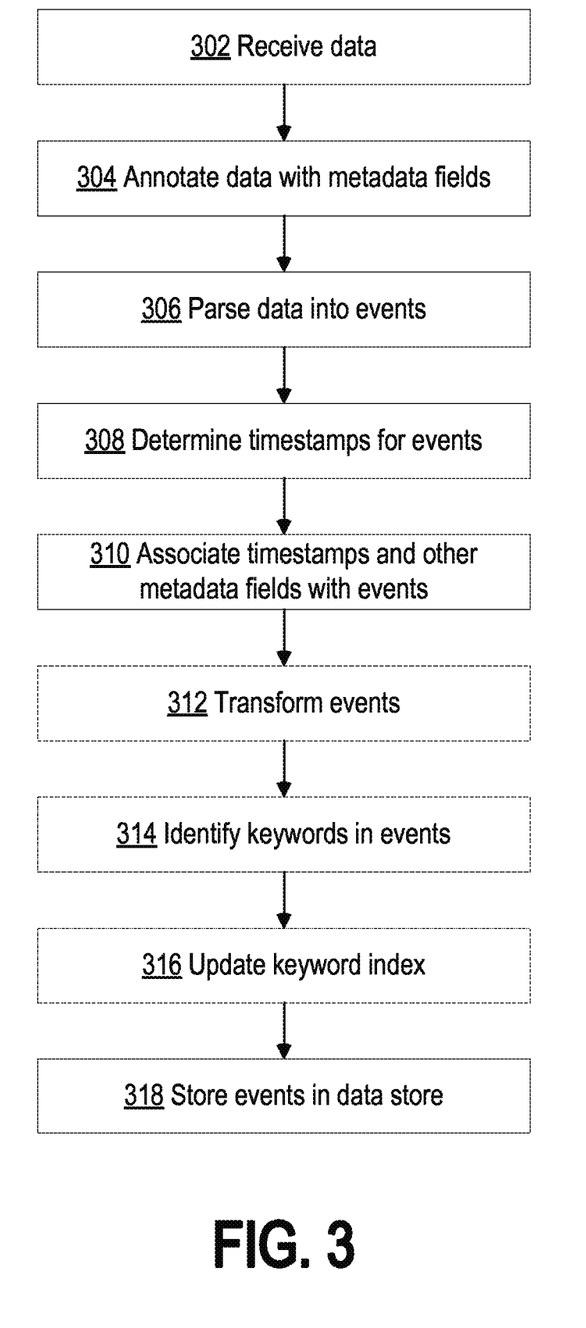
FIG. 3 is a flow diagram that illustrates an example of a process by which indexers can process, index, and store data received from forwarders.

FIG. 3 illustrates an example of a process flow within the MDASS 108. The process flow illustrated in FIG. 3 is provided for illustrative purposes only; one or more of the steps illustrated in FIG. 3 may be removed and/or the ordering of the steps may be changed. Furthermore, for the purposes of illustrating a clear example, one or more particular system components is described as performing various operations during each of the data flow stages; for example, a forwarder is described as receiving and processing data during an input phase, an indexer is described as parsing and indexing data during parsing and indexing phases, and a search head is described as performing a search query during a search phase. However, other system arrangements and distributions of the processing steps across system components may be used.

At step 302, a forwarder receives data from an input source. A forwarder, for example, initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks" or "buckets," possibly of a uniform data size, to facilitate subsequent processing steps.

At step 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing steps. In an embodiment, a forwarder then forwards the data to another system component for further processing, typically forwarding the annotated data blocks to one or more indexers.

At step 306, an indexer receives data blocks from a forwarder and parses the data to organize the data into events. This parsing process may be at least partially based on recognizing/matching patterns in the data. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer what are the boundaries of events within the data. In general, these properties may include regex-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data and apply an inferred source type definition to the data to create the events.

At step 308, the indexer determines a timestamp for each event. Similarly to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or based on any other rules for determining timestamps.

At step 310, the indexer associates with each event one or more metadata fields including a field containing the timestamp determined for the event. These metadata fields may include a number of "default fields" that are associated with all events, and may also include one more custom fields as defined by a user. Similarly to the metadata fields associated with the data blocks at step 304, the default metadata fields associated with each event may include a host, source, and source type field in addition to a field storing the timestamp.

At step 312, an indexer may optionally apply one or more transformations to data included in the events created at step 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

At steps 314 and 316, an indexer can optionally generate a keyword index to facilitate fast keyword searching for event data. To build a keyword index, at step 314, the indexer identifies a set of keywords in each event. At step 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At step 318, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in faster memory to facilitate faster retrieval. For example, buckets containing the most recent events can be stored in flash memory instead of on hard disk.

Each indexer 206 may be responsible for storing and searching a subset of the events contained in a corresponding data store 208. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query. Moreover, events and buckets can also be replicated across different indexers and data stores to facilitate high availability and disaster recovery.

Figure 4:
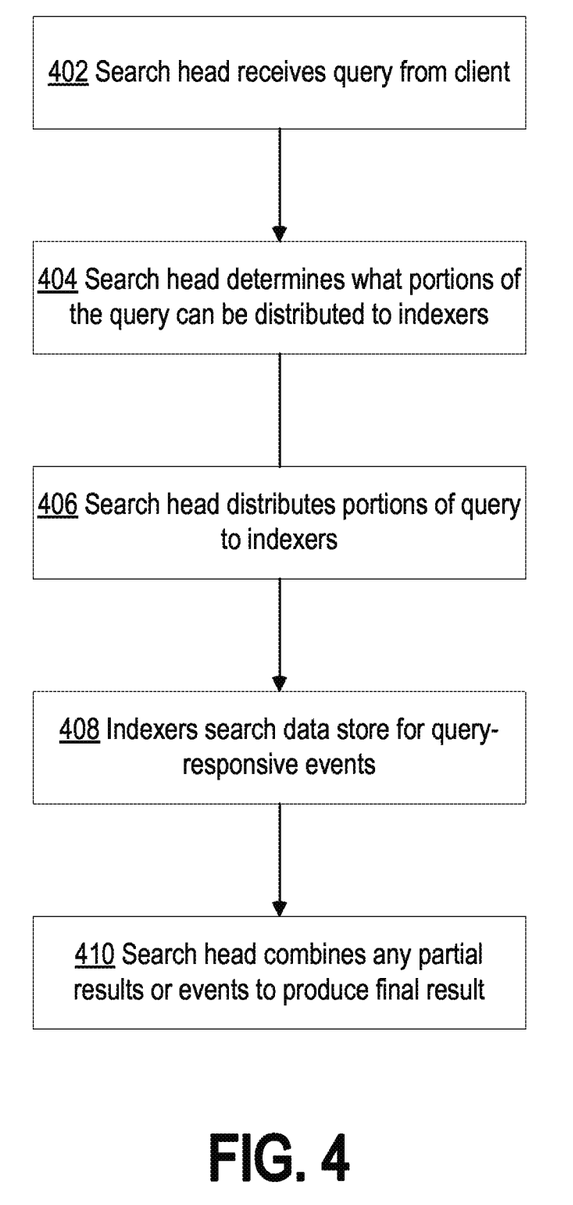
FIG. 4 is a flow diagram that illustrates an example of a process by which a search head and indexers can perform a search query.

FIG. 4 illustrates an example of process that a search head and one or more indexers may perform during a search query. At step 402, a search head receives a search query from a client. The search query may have been initiated by a human user of the client. At step 404, the search head analyzes the search query to determine what portions of the query can be delegated to indexers and what portions can be executed locally by the search head. At step 406, the search head distributes the determined portions of the query to the appropriate indexers. In an embodiment, a search head cluster may take the place of an independent search head where each search head in the search head cluster coordinates with peer search heads in the search head cluster to schedule jobs, replicate artifacts, update configurations, fulfill search requests, etc.

At step 408, the indexers to which the query was distributed search their data stores for events that are responsive to the query. To determine which events are responsive to the query, the indexer searches for events that match the criteria specified in the query. This criteria can include matching keywords or specific values for certain fields. In searches that use a late-binding schema, the searching operations at step 408 may involve using the late-binding schema to extract values for specified fields from events at the time the query is processed. In an embodiment, one or more rules for extracting field values may be specified as part of a source type definition. The indexers may then either send the relevant events back to the search head, or use the events to calculate a partial result, and send the partial result back to the search head.

At step 410, the search head combines the partial results and/or events received from the indexers to produce a result for the query. This result may comprise different types of data depending on what the query requested. For example, the results can include a listing of matching events returned by the query, or some type of visualization of the data from the returned events. In another example, the final result can include one or more calculated values derived from the matching events.

The results generated by the MDASS 108 can be returned to a client using any of various different techniques. For example, one technique streams results back to a client in real-time as they are identified. Another technique waits to report the results to the client until a complete set of results is ready to return to the client. Yet another technique streams interim results back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

The search head 210 allows users to search and visualize event data extracted from raw machine data received from homogenous data sources, it also allows users to search and visualize event data extracted from raw machine data received from heterogeneous data sources. The search head 210 includes various mechanisms for processing a query which may additionally reside in an indexer 206. A search query may expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. A search query can also be expressed in other query languages, such as the Structured Query Language ("SQL") or any other query language.

In response to receiving the search query, search head 210 determines that it can use extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Cloud-Based Embodiments

The example MDASS 108 described above is primarily an on-premises solution. Some users may prefer an on-premises solution, because it may provide a greater level of control over the configuration of certain aspects of the system. However, other users may instead prefer an arrangement in which the user is not directly responsible for providing and managing the computing devices upon which various components of system 108 operate. Therefore, to provide an alternative to an entirely on-premises MDASS 108, one or more components of an MDASS instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based MDASS by managing computing resources configured to implement various aspects of the system (e.g., forwarders, indexers, search heads, etc.) and providing access to the system to end users via a network. Typically, a user may pay a subscription or other fee to use such a service, and each subscribing user to the cloud-based service may be provided with an account that enables the user to configure a customized cloud-based system based on the user's preferences.

Figure 5:
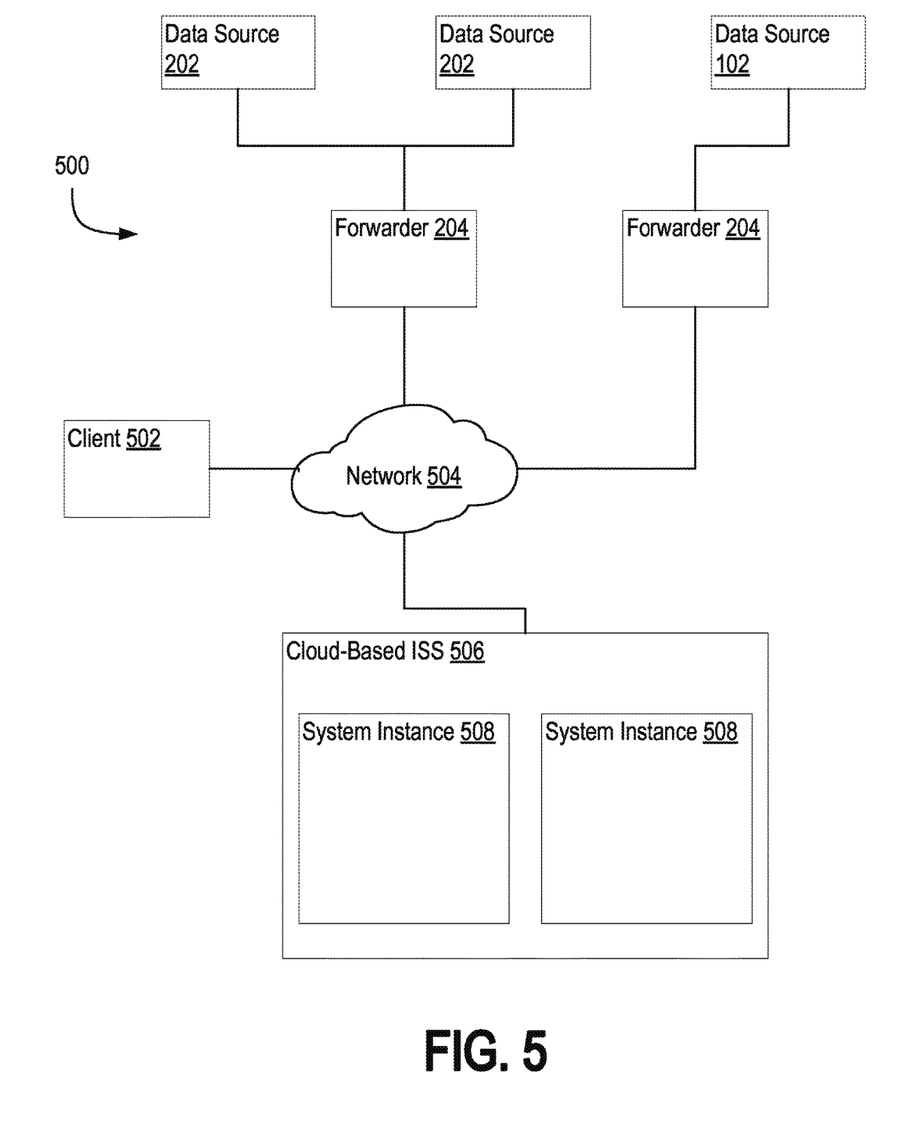
FIG. 5 illustrates an example of a cloud-based MDASS.

FIG. 5 is a block diagram showing an example of a cloud-based MDASS. In this context the term "cloud-based" does not necessarily mean that every component of the MDASS is located "in the cloud" or off-premises (although that may be the case). Rather, it means that at least some components of, and services provided by, the MDASS are implemented by computing resources located off-premises and provided to the user via a network. Some components of a cloud-based MDASS may still be located on-premises, however, even in a cloud-based embodiment.

For example, in embodiments represented in FIG. 5, one or more forwarders 204 and data sources 202 are implemented on-premises, while the remainder of the MDASS (e.g., indexers, data store and search head) is implemented by a cloud-based indexing and search subsystem (ISS) 506. In other embodiments, the forwarders 204 and data sources 202 might instead be implemented in the cloud while at least some of the rest of the MDASS is implemented on-premises. Similarly to the system of FIG. 2, the networked computer system 500 in FIG. 5 includes input data sources 202 and forwarders 204, indexers and a search head. The one or more forwarders 204 and client devices 502 are coupled to the cloud-based ISS 506 via one or more networks 504. The cloud-based ISS 506 includes the indexers, search head and primary data stores. Network 504 broadly represents one or more LANs, WANs, cellular networks, intranetworks, internetworks, etc., using any of wired, wireless, terrestrial microwave, satellite links, etc., and may include the public Internet, and is used by client devices 502 and forwarders 204 to access the system 506. Similarly to MDASS 108 of FIG. 2, each of the forwarders 204 may be configured to receive raw machine data from an input source and to forward the machine data to other components of the system 506 for further processing.

The ISS 506 may comprise a plurality of system instances 508. In general, each system instance 508 may include one or more computing resources managed by a provider of the cloud-based system 506 made available to a particular subscriber. The computing resources comprising a system instance 508 may include, for example, one or more servers or other devices configured to implement one or more forwarders, indexers, search heads, and other components of an MDASS, having functionality as described above with respect to MDASS 108 in FIG. 2. As indicated above, a subscriber may use a web browser or other application of a client device 502 to access a web portal or other interface that enables the subscriber to configure a system instance 508.

Each of the components of an MDASS (e.g., forwarders, indexers and search heads) may at times access one or more configuration files that may be stored locally at each component. These configuration files may involve some level of user configuration to accommodate particular types of data that a user desires to analyze and to account for other user preferences. In a cloud-based service context, users may not have direct access to the underlying computing resources implementing the various system components (e.g., the computing resources comprising each system instance 508) and may desire to make such configurations indirectly, for example, by using one or more web-based interfaces.

Figure 6:
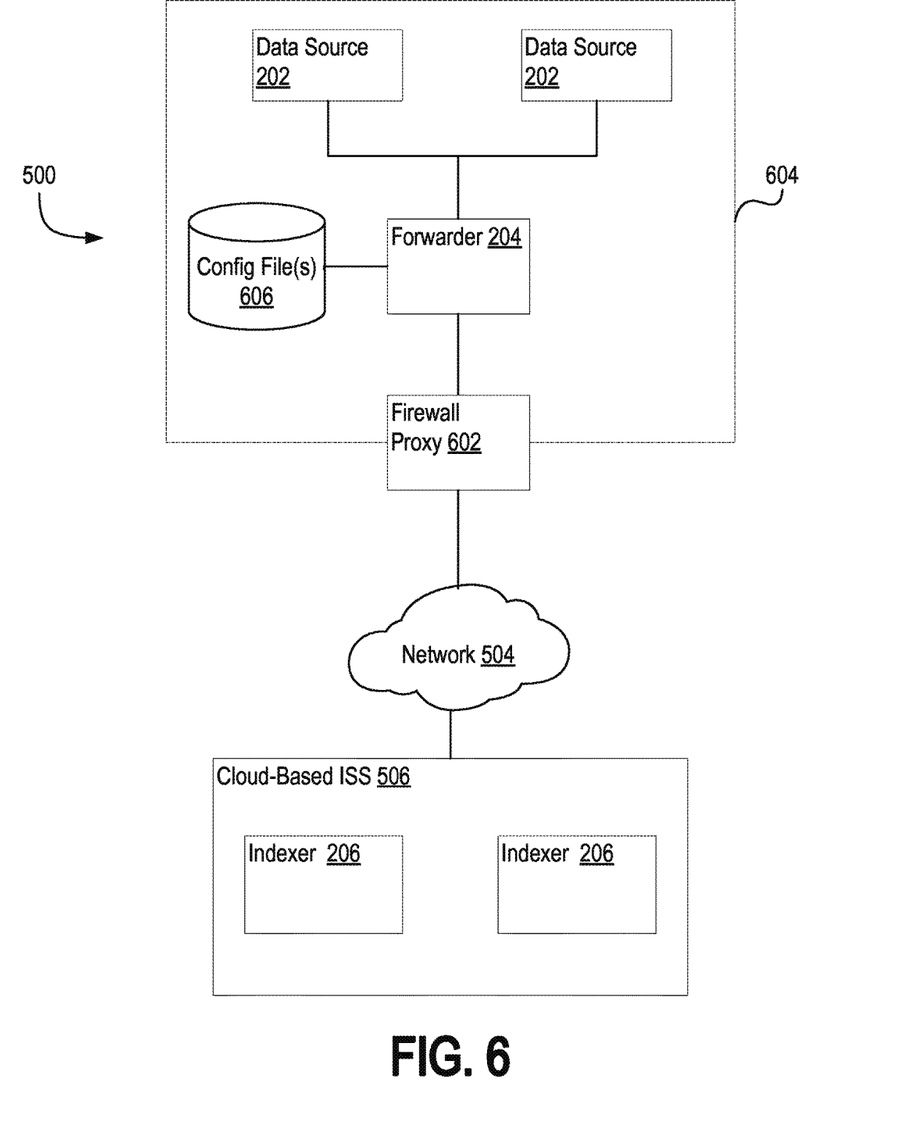
FIG. 6 illustrates an example of the cloud-based MDASS of FIG. 5 in greater detail.

Providing a cloud-based MDASS presents certain challenges. For example, on-premises computing resources may be protected by security features that can complicate or potentially prevent the forwarding of data from on-premises forwarders 204 to cloud-based indexer(s) 206. Some users may protect their computing resources by using a firewall proxy that implements an authentication protocol to regulate traversal of a firewall. An example of such a scenario is shown in FIG. 6, which is discussed below. Such a firewall proxy may implement, for example, version 5 of the SOCKS protocol, i.e., SOCKS5, for purposes of regulating firewall traversal. Note that the terms "authenticating" and "authentication," as used herein, each can mean that portion of an authentication process performed by an entity whose identity and/or access rights are to be verified by the authentication process (the "requester"), or that portion of an authentication process performed by an entity that determines whether the identity and/or access rights of the requester are valid (the "authenticator"), or the combination of such portions.

As shown in FIG. 6, a firewall proxy 602 implements and regulates traversal of a firewall that protects a computing environment ("protected environment") 604. The data sources 202 and forwarders 204 operate within the protected environment 604. In other embodiments, the forwarders 204 and data sources 202 might instead be implemented outside the protected environment 604 (e.g., in the cloud) while at least some of the rest of the MDASS (e.g., indexers, data store and/or search head) is implemented within the protected environment 604 (e.g., on-premises). For simplicity, only one forwarder 204 is shown in FIG. 6, although multiple forwarders 204 may be present, as shown in FIG. 5. Each forwarder 204 has access to one or more configuration files 606 within the protected environment 604. In an embodiment, the firewall proxy 602 may use the SOCKS5 protocol to regulate traversal of the firewall. In such an embodiment, at least one of the configuration files 606 may include information for use by a forwarder 204 in a SOCKS5 authentication process, such as the firewall proxy's SOCKS5 source address, DNS name and port number of the indexers of the MDASS, and the forwarder's SOCKS5 username and password.

In some embodiments the computer system 500 implements a role based access control (RBAC) scheme. For example, each forwarder 204 may be assigned a particular role based on, for example, the type of data that it gathers and forwards and/or other criteria. Different levels of authentication may be required for different forwarders, based on their assigned roles (which may include exempting certain forwarders from authentication and/or requiring more rigorous authentication for other forwarders, based on their roles). The various levels of authentication may be enforced, at least in part, by the firewall proxy 602.

Figure 7:
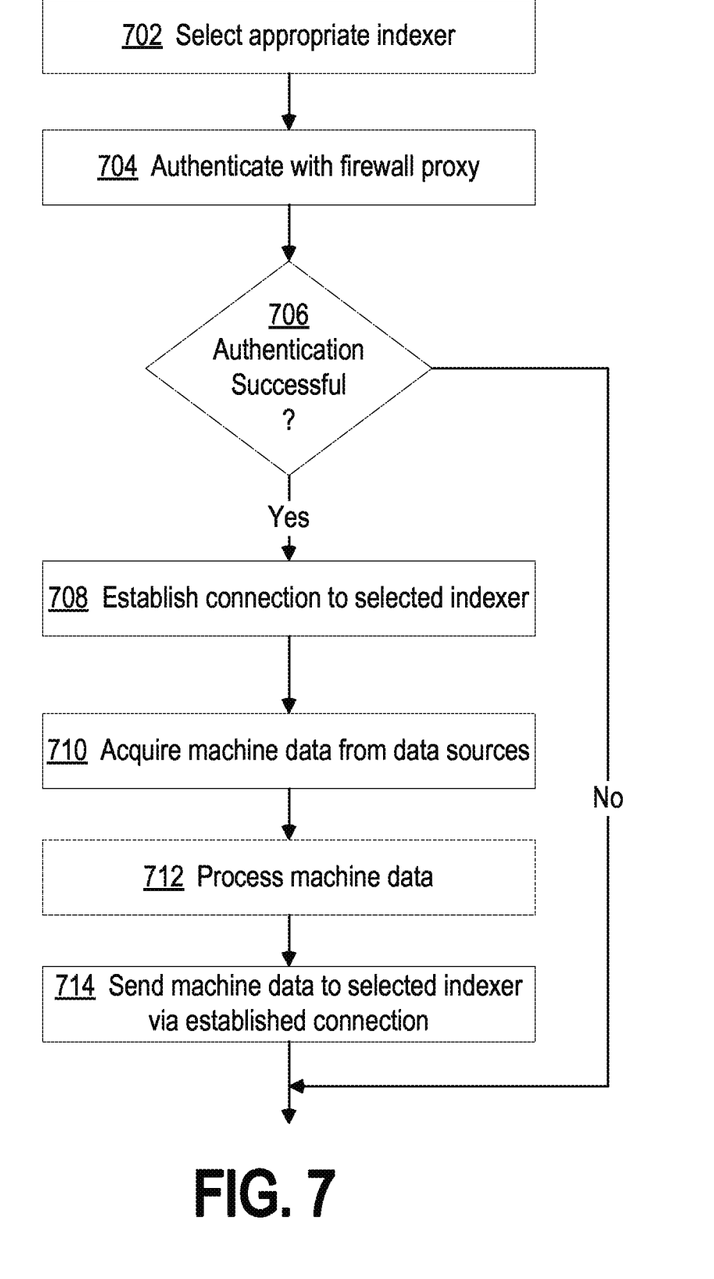
FIG. 7 is a flow diagram illustrating an example of a process that a forwarder can implement in a cloud-based embodiment to establish a connection to, and carry out communication with, an indexer.

FIG. 7 is a flow diagram illustrating a process that a forwarder 204 can implement in a cloud-based embodiment such as shown in FIGS. 5 and 6, to establish a connection to, and carry out communication with, an indexer. Note that each forwarder 204 within the protected environment 604 will normally implement the process, or a similar process, to authenticate itself with the firewall proxy 602. The data flow illustrated in FIG. 7 is provided for illustrative purposes only; one or more of the steps of the processes illustrated in FIG. 7 may be removed and/or the ordering of the steps may be changed. Furthermore, for the purposes of illustrating a clear example, one or more particular system components is described as performing various operations during each of the data flow stages. However, it is noted that other system arrangements and distributions of the processing steps across system components may be used.

At step 702, the forwarder selects the appropriate indexer 206 to which the forwarder 204 will send machine data that it acquires from one or more data sources 202. As indicated above, the forwarder 204 may select an indexer 206 based on any of various criteria, such as the source type of the data, load balancing criteria, etc. Next, at step 704 the forwarder 204 authenticates itself with the firewall proxy 602. In some embodiments, this is done by a SOCKS5 message exchange between the forwarder 204 and firewall proxy 602. In some embodiments, the authentication process may involve a username/password challenge/response sequence controlled by the firewall proxy 602.

In some embodiments, the forwarder initially performs a DNS lookup to determine the IP address of the of the selected indexer, and then contacts the firewall proxy 602 to request a connection to that IP address, which triggers the firewall proxy 602 to initiate the authentication process. In other embodiments, the forwarder 204 may send a host name of the selected indexer to the firewall proxy 602, to cause the firewall proxy 602 to look up the IP address of the indexer, and to trigger the firewall proxy 602 to initiate the authentication process.

If the authentication is not successful (step 706), as indicated by a failure message from the firewall proxy 602 to the forwarder 204, the process terminates. In that event, the firewall proxy 602 will not permit the forwarder 204 to establish a connection to the selected indexer 206 (in the event the forwarder 204 attempts to establish such a connection). If the authentication is successful (step 706), as indicated by a success message from the firewall proxy 602 to the forwarder 204, the process continues to step 708. In that event, the firewall proxy 602 will permit the forwarder 204 to establish a connection to the selected indexer 206.

If authentication was successful, then at step 708 the forwarder 204 establishes a connection through the firewall proxy 602 and the network 504 to the selected indexer 206. The connection may be, for example, a TCP/IP connection. In other embodiments, the connection may bypass the firewall proxy 602 and/or may use protocols other than TCP/IP. Next, the forwarder 204 operates as described above to acquire machine data from one or more data sources 202 at step 710. In other embodiments, the forwarder 204 may acquire at least some of the data before it completes the authentication process and locally buffer that data until it completes the authentication process. Optionally, at step 712 the forwarder 204 then processes the machine data as described above (e.g., by forming the data into blocks or buckets, encoding the data, etc.). The forwarder 204 then sends the machine data to the selected indexer at step 714, via the connection that it established in step 708. This communication may be done by using one or more protocols on top of TCP/IP on the connection, such as Secure Sockets Layer (SSL) and/or the Splunk-2-Splunk (S2S) protocol.

In a cloud-based embodiment in which the forwarders operate behind a firewall, each forwarder 204 will normally carry out the above described process, or a similar process, to establish communication with an appropriate indexer 206.

Additionally, any given forwarder 204 may be configured to send data to two or more indexers 206 (and multiple forwarders may send data to the same indexer). In such an embodiment, a forwarder 204 may terminate its connection to one indexer before establishing a new connection and sending data to another indexer 206. In that case, the forwarder 204 may authenticate with the firewall proxy 602 each time it needs to send data to a different indexer, e.g., each time it needs to establish a connection to a different indexer.

Cloud-based embodiments other than that shown in FIG. 6 are also possible. For example, instead of implementing an authentication protocol/capability in each forwarder 204, one could provide an additional, special-purpose proxy between the forwarders 204 and the firewall proxy 602. The additional proxy could be transparent to the forwarders 204 and perform SOCKS5 authentication with the firewall proxy 602 on behalf of the forwarders 204. In that case, the forwarders 204 could communicate with the additional proxy using standard TCP/IP, for example.

Figure 8:
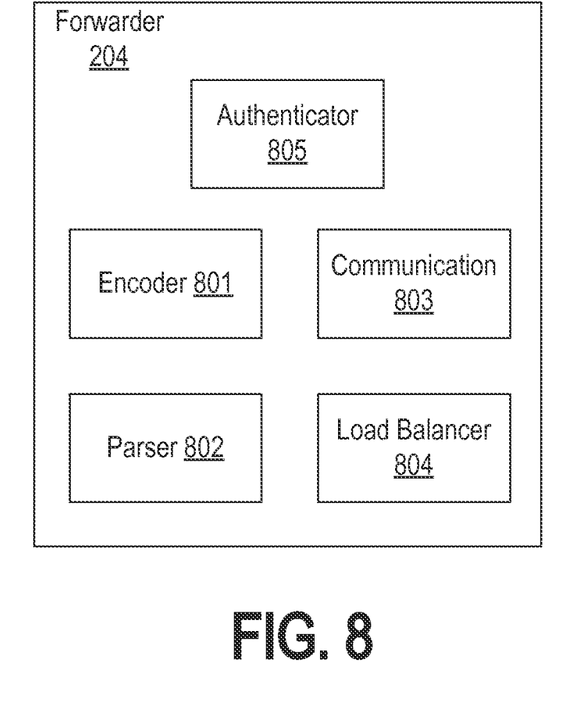
FIG. 8 is a block diagram showing an example of functional modules of a forwarder for use in a cloud-based implementation.

FIG. 8 is a block diagram showing functional modules of a forwarder 204 according to at least some embodiments. Note, however, that in other embodiments a forwarder 204 may have additional functional modules not shown in FIG. 8 and/or may omit one or more of the modules shown in FIG. 8. The forwarder 204 in FIG. 8 includes an encoder 801, a parser 802, a communicator 803, a load balancer 804, and an authenticator 805. Each of these modules can be implemented by programmable circuitry programmed with software to perform the functions attributed to such module, or can be implemented as hardwired circuitry, or a combination thereof.

In an embodiment, the encoder 801 performs initial, "light" encoding of acquired machine data, such as UTF-8 encoding. With respect to parser 802, in a cloud-based implementation it may be more efficient to perform any required parsing in one or more indexers located in the cloud. However, if and to the extent parsing capability is needed or desired in the forwarder 204, parser 802 performs such functionality, e.g., by parsing the acquired machine data according to one or more criteria, such as based on timestamps. The communicator 803 is responsible for implementing the communication protocols to enable communication between the forwarder 204 and the one or more indexers located in the ISS 506. Communicator 803 may implement protocols such as TCP/IP, HTTP, one or more proprietary protocols, etc. Communicator 803 may also be responsible for encrypting the data (e.g., using SSL), if encryption is desired. The load balancer 804 is responsible for selecting an appropriate indexer based on one or more load balancing criteria, e.g., to avoid overloading any indexer. The authenticator 805 is responsible for implementing the authentication process to authenticate the forwarder 204 with the firewall proxy 602, such as by using SOCKS5 protocol, for example.

Figure 9:
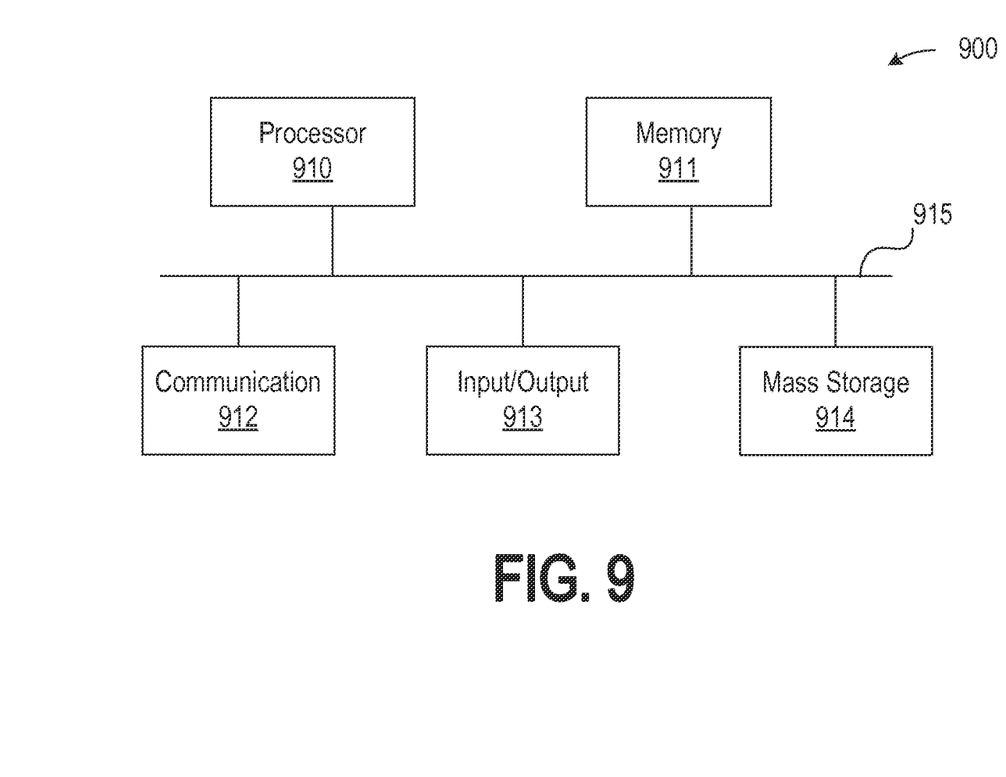
FIG. 9 is a high-level block diagram showing an example of a hardware architecture of a processing system that can be used to implement components of the MDASS.

FIG. 9 shows a high-level example of a hardware architecture of a processing system that can be used to implement any one or more of the components referred to above (e.g., forwarders, indexer, search head, data store). One or multiple instances of an architecture such as shown in FIG. 9 (e.g., multiple computers) can be used to implement the techniques described herein, where multiple such instances can be coupled to each other via one or more networks.

The illustrated processing system 900 includes one or more processors 910, one or more memories 911, one or more communication device(s) 912, one or more input/output (I/O) devices 913, and one or more mass storage devices 914, all coupled to each other through an interconnect 915. The interconnect 915 may be or include one or more conductive traces, buses, point-to-point connections, controllers, adapters and/or other conventional connection devices. Each processor 910 controls, at least in part, the overall operation of the processing device 900 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 911 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 914 can be or include one or more hard drives, digital versatile disks (DVDs), flash memories, or the like. Each memory 911 and/or mass storage 914 can store (individually or collectively) data and instructions that configure the processor(s) 910 to execute operations to implement the techniques described above. Each communication device 912 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 900, each I/O device 913 can be or include a device such as a display (which may be a touch screen display), audio speaker, keyboard, mouse or other pointing device, microphone, camera, etc. Note, however, that such I/O devices may be unnecessary if the processing device 900 is embodied solely as a server computer.

In the case of a user device, a communication devices 912 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication devices 912 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   authenticating, by using a SOCKS5 authentication process, a first data forwarder of a distributed machine data acquisition and search system (MDASS), to a node that regulates traversal of a firewall that protects a protected environment within which the data forwarder operates; and
   only after successful completion of the SOCKS5 authentication process,
      establishing a first connection, through a network, between the first data forwarder and a first indexer of the distributed MDASS, the first indexer operating outside the protected environment; and
      sending machine data acquired by the first data forwarder from a machine data source, to the first indexer via the first connection.

2. The method of claim 1, further comprising:
   only after successful completion of said authenticating or a subsequent execution of said authenticating,
      establishing a second connection, through the network, between the first data forwarder and a second indexer of the distributed MDASS, the second indexer operating outside the protected environment; and
      sending machine data acquired by the first data forwarder to the second indexer via the second connection.

3. The method of claim 1, said method comprising:
   authenticating each of a plurality of data forwarders of the distributed MDASS, with the node, by using the SOCKS5 authentication process, each of the plurality of data forwarders operating inside the protected environment, the plurality of data forwarders including the first data forwarder; and
   for each of the plurality of data forwarders, and only after successful completion of the SOCKS5 authentication process,
      establishing a separate connection, through the network, between said data forwarder and a selected indexer of a plurality of indexers of the distributed MDASS, the plurality of indexers operating outside the firewall; and
      sending machine data acquired by said data forwarder to the selected indexer via the separate connection.

4. The method of claim 1, wherein the network comprises the Internet.

5. The method of claim 1, further comprising:
   prior to said authenticating the first data forwarder, identifying the first indexer, from among a plurality of indexers of the MDASS, as an appropriate indexer to which to send machine data acquired by the first data forwarder, wherein said authenticating the first data forwarder is performed in response to identifying the first indexer as the appropriate indexer.

6. The method of claim 1, further comprising, by the first data forwarder, and prior to sending the machine data to the first indexer:
   acquiring the machine data from the machine data source;
   buffering the machine data inside the protected environment; and
   encoding and/or encrypting the time-stamped machine data.

7. The method of claim 1, further comprising:
   acquiring machine data from a plurality of diverse machine data sources; and
   sending at least a portion of the machine data acquired from the plurality of diverse machine data sources to the first indexer via the first connection.

8. The method of claim 1, further comprising:
   acquiring machine data from a plurality of diverse machine data sources;

sending a first portion of the machine data acquired from the plurality of diverse machine data sources to the first indexer via the first connection; and sending a second portion of the machine data acquired from the plurality of diverse machine data sources to a second indexer of the MDASS via a second connection.

9. The method of claim 1, further comprising:
parsing the acquired machine data into a plurality of machine data events; and
determining a time stamp for each of the machine data events.

10. The method of claim 1, further comprising:
using at least the first indexer to index the plurality of machine data events;
storing the indexed machine data events in a data store outside the firewall; and
retrieving at least a subset of the indexed machine data events from the data store in response to a search query from a user.

11. The method of claim 1, further comprising:
parsing the acquired machine data into a plurality of machine data events;
determining a time stamp for each of the machine data events;
using at least the first indexer to index the plurality of machine data events;
storing the indexed machine data events in a data store outside the firewall; and
retrieving at least a subset of the indexed machine data events from the data store in response to a search query from a user.

12. The method of claim 1, wherein said authenticating is part of a role based access control scheme, and wherein the data forwarder has an assigned role of the role based access control scheme.

13. The method of claim 1, further comprising:
storing the machine data as events in a data store outside the firewall;
receiving a query to be applied to the events in the data store;
using a schema defined after the events have been stored in the data store, to extract data values from the events in response to the query; and
processing the query using the retrieved data values.

14. The method of claim 1, wherein the machine data originates from within the protected environment.

15. The method of claim 1, wherein the machine data originates from outside the protected environment.

16. The method of claim 1, wherein the machine data originates from cloud-based equipment.

17. The method of claim 1, wherein the machine data originates from on-premises equipment.

18. The method of claim 1, wherein at least a portion of the MDASS, including the first indexer, is implemented in cloud-based equipment.

19. The method of claim 1, further comprising:
implementing the data forwarder in on-premises equipment, wherein the machine data originates from on-premises equipment, and wherein the first indexer is implemented in cloud-based equipment.

20. The method of claim 1, further comprising:
using pattern matching to identify events from the machine data.

21. The method of claim 1, wherein the machine data is indicative of performance or operation of a computing system.

22. The method of claim 1, wherein the machine data is indicative of performance or operation of a computing system and originates from on-premises equipment within the protected environment.

23. A computer system configured to implement at least a first data forwarder of a distributed machine data acquisition and search system (MDASS), the computer system comprising:
a communication device through which the data forwarder can communicate with a proxy node that regulates traversal of a firewall that protects a protected environment within which the computer system operates; and
at least one processor operatively coupled to the communication device and configured to execute operations including
authenticating, by using a SOCKS5authentication process, the first data forwarder of the MDASS to a proxy node, the first data forwarder operating inside the protected environment; and
only after successful completion of the SOCKS5 authentication process,
establishing a first connection, through the a network, between the first data forwarder and a first indexer of the distributed MDASS, the first indexer operating outside the protected environment; and
sending machine data, acquired by the first data forwarder from a machine data source, to the first indexer via the first connection.

24. The computer system of claim 23, the operations further comprising:
only after successful completion of said authenticating or a subsequent execution of said authenticating,
establishing a second connection, through the network, between the first data forwarder and a second indexer of the distributed MDASS, the second indexer operating outside the protected environment; and
sending machine data acquired by the first data forwarder to the second indexer via the second connection.

25. The computer system of claim 23, the operations comprising:
authenticating each of a plurality of data forwarders of the distributed MDASS, with the proxy node, by using the SOCKS5 authentication process, each of the plurality of data forwarders operating inside the protected environment, the plurality of data forwarders including the first data forwarder; and
for each of the plurality of data forwarders, and only after successful completion of the SOCKS5 authentication process,
establishing a separate connection, through the network, between said data forwarder and a selected indexer of a plurality of indexers of the distributed MDASS, the plurality of indexers operating outside the protected environment; and
sending machine data acquired by said data forwarder to the selected indexer via the separate connection.

26. The computer system of claim 23, the operations further comprising:
acquiring machine data from a plurality of diverse machine data sources;
sending a first portion of the machine data acquired from the plurality of diverse machine data sources to the first indexer via the first connection; and sending a second portion of the machine data acquired from the plurality of diverse machine data sources to a second indexer of the MDASS via a second connection.

27. A non-transitory machine-readable storage medium for use in a processing system, the non-transitory machine-readable storage medium storing instructions, an execution of which in the processing system causes the processing system to perform operations comprising:
authenticating a first data forwarder of a distributed machine data acquisition and search system (MDASS) to a proxy node, by using a SOCKS5 authentication process, the first data forwarder operating inside a protected environment established by a firewall, traversal of which is regulated by the proxy node; and
only after successful completion of the SOCKS5 authentication process,
establishing a first connection, through a network, between the first data forwarder and a first indexer of the distributed MDASS, the first indexer operating outside the protected environment; and
sending machine data acquired by the first data forwarder from a machine data source, to the first indexer via the first connection.

28. The non-transitory machine-readable storage medium of claim 27, the operations further comprising:
only after successful completion of said authenticating or a subsequent execution of said authenticating,
establishing a second connection, through the network, between the first data forwarder and a second indexer of the distributed MDASS, the second indexer operating outside the protected environment; and
sending machine data acquired by the first data forwarder to the second indexer via the second connection.

29. The non-transitory machine-readable storage medium of claim 27, the operations comprising:
authenticating each of a plurality of data forwarders of the distributed MDASS, with the proxy node, by using the SOCKS5 authentication process, each of the plurality of data forwarders operating inside the protected environment, the plurality of data forwarders including the first data forwarder; and
for each of the plurality of data forwarders, and only after successful completion of the SOCKS5 authentication process,
establishing a separate connection, through the network, between said data forwarder and a selected indexer of a plurality of indexers of the distributed MDASS, the plurality of indexers operating outside the protected environment; and
sending machine data acquired by said data forwarder to the selected indexer via the separate connection.

30. The non-transitory machine-readable storage medium of claim 27, the operations further comprising:
acquiring machine data from a plurality of diverse machine data sources;
sending a first portion of the machine data acquired from the plurality of diverse machine data sources to the first indexer via the first connection; and
sending a second portion of the machine data acquired from the plurality of diverse machine data sources to a second indexer of the MDASS via a second connection.

* * * * *